Patented Oct. 26, 1926.

1,604,664

UNITED STATES PATENT OFFICE.

WILLIAM F. SCHROEDER, OF MINNEAPOLIS, MINNESOTA.

CASEIN GLUE.

No Drawing.    Application filed July 26, 1922.   Serial No. 577,752.

My invention relates to adhesive substances which have casein as their main base and which are generally known as "casein glues." In addition to high efficiency as an applied adhesive, it is highly important that these glues, when prepared in liquid form and thus conditioned for use, be of such nature that they will maintain an adhesive efficiency for a long period of time. Carbonates have generally been considered as detrimental in glues of the casein type, but I have discovered that magnesium carbonate, when used with casein and sodium fluoride, does not decrease the adhesive quality of the applied glue but rather increases the efficiency of the glue and greatly lengthens the time that the glue in liquid form will maintain its adhesive efficiency. I have obtained a wonderfully efficient casein glue by the following formula:

|  | Per cent. |
|---|---|
| Casein | 77 |
| Lime | 10 |
| Sodium fluoride | 8 |
| Sodium sulphite | 3 |
| Magnesium carbonate | 2 |

I have also determined, by experiments, that improved glues can be made substantially in accordance with the above formula but by varying the percentages of magnesium carbonate from one to ten per cent, by varying the sodium fluoride from five to twenty per cent and by varying the sodium sulphite from two to eight per cent. The above percentages are given in respect to weight.

The above noted substances will be commingled in dry form and will usually be sold in dry form, but when it is to be used, it will be introduced into water to form an emulsion and it is then, of course, that the chemical reactions that develop the adhesive qualities of the composition will take place. After these reactions have taken place, the emulsion is adapted to be used as glue or as a coating or to be commingled with other substances such as paint or calcimine, which contain color pigments. When the composition is to be used simply as a glue, no additions to the formula given except water will be required.

As a substitute for sodium sulphite, I have found that I can use tri-sodium phosphate, both of these substances being salts of soda. I have also found that I can reduce the amount of magnesium carbonate required by using at least in part calcium carbonate, both of which substances are carbonates, but by far the best results are given by the use of magnesium carbonate. The carbonates absorb the ammonia which is developed in the chemical reaction that takes place when the glue has been made in liquid form or in an emulsion and is allowed to stand for a considerable time. The ammonia, if allowed to remain in the emulsion formed by the composition and water, will, in a short time, destroy the adhesive qualities of the casein glue, and, hence, the elimination of ammonia is important. Another important result is found in the fact that the set glue does not, as is usual, become so hard as to damage saws, planes and the like, but has a tough character capable of being readily cut by sharp tools.

Magnesium carbonate retards the hydrolysis of the casein, when the casein is subjected to the action of an alkali. Magnesium carbonate in itself has but a very slight action on the casein, but in combination with the other ingredients, forms a highly efficient glue that will not set too rapidly.

What I claim is:

An adhesive composition made substantially in accordance with the following formula:

|  | Per cent. |
|---|---|
| Casein | 77 |
| Lime | 10 |
| Sodium fluoride | 8 |
| Sodium sulphite | 3 |
| Magnesium carbonate | 2 |

In testimony whereof I affix my signature.

WILLIAM F. SCHROEDER.